United States Patent [19]

Iijima et al.

[11] Patent Number: 5,368,116
[45] Date of Patent: Nov. 29, 1994

[54] METHOD OF CONTROLLING ELECTRIC VEHICLE DRIVEN BY AN INTERNAL COMBUSTION ENGINE

[75] Inventors: Katsuhiko Iijima; Shigenori Kinoshita, both of Kanagawa, Japan

[73] Assignees: Fuji Electric Co., Ltd., Kanagawa; Mitsubishi Heavy Industries, Ltd., Tokyo, both of Japan

[21] Appl. No.: 957,179

[22] Filed: Oct. 7, 1992

[30] Foreign Application Priority Data

Oct. 8, 1991 [JP] Japan .................. 3-289133

[51] Int. Cl.⁵ .............................. B60L 11/02
[52] U.S. Cl. .................... 180/65.4; 60/716
[58] Field of Search ............ 180/65.1, 65.2, 65.3, 180/65.4; 60/716

[56] References Cited

U.S. PATENT DOCUMENTS 4,143,280  3/1979  Kuehn, Jr. et al. ............ 290/9
4,951,769  8/1990  Kowamura ............... 180/65.4

FOREIGN PATENT DOCUMENTS 37-64201A   3/1962  Japan .
52-149917  12/1977  Japan .
59-106027   6/1984  Japan .
59-114626   7/1984  Japan .
60-77607A   5/1985  Japan .
60-187201A  9/1985  Japan .
1-253020   10/1989  Japan .

Primary Examiner—Richard M. Camby
Attorney, Agent, or Firm—Finnegan, Henderson, Farabow, Garrett & Dunner

[57] ABSTRACT

Disclosed is a method of controlling an internal combustion engine driven electric vehicle in power operation of the vehicle, in which control is made so that a voltage of a DC intermediate circuit is maintained to a first constant DC voltage in a first speed range of from a zero vehicle speed to a first vehicle speed, the voltage of the DC intermediate circuit is changed in proportion to the vehicle speed in the second speed range of from the first vehicle speed to a second vehicle speed, and the voltage of the DC intermediate circuit is made to be a second constant DC voltage in the third speed range not lower than the second vehicle speed, and control is further made so that an AC output of the second power converter is made to have a variable voltage and a variable frequency in the first and second speed ranges, while the AC output of the second power converter is made to have a constant voltage and a variable frequency in the third speed range.

3 Claims, 3 Drawing Sheets

METHOD OF CONTROLLING ELECTRIC VEHICLE DRIVEN BY AN INTERNAL COMBUSTION ENGINE

BACKGROUND OF THE INVENTION

1. Field of the Invention

The present invention relates to a method of controlling an electric vehicle driven by an internal combustion engine, and particularly relates to an internal combustion engine driven electric vehicle in which a generator is driven by an internal combustion engine so that wheel-driving induction motors are driven by an AC output of the generator through power converters.

2. Discussion of the Related Art

In a vehicle for a large-sized construction machine such as a large-sized dump truck, a self-running-type crane car, etc., it is desired that instruments to be mounted on the vehicle be small in size and light in weight, so that the maintenance of the instruments is easy, and further that a continuous non-mechanical (electric) speed-suppressing brake is obtained for continuously coming down along a slope. To this end, an electric driving means in which an AC generator is driven by an internal combustion engine and an output of the AC generator is converted by a semiconductor power converter into AC power having a variable voltage and a variable frequency to thereby drive induction motors connected to wheels has been used more widely than a conventional mechanical driving means in which power generated by an internal combustion engine is applied to wheels through a clutch, a reduction gear, and a differential gear to thereby drive the wheels.

FIG. 4 is a schematic diagram of a main circuit of a conventional internal combustion engine driven electric vehicle arranged such that wheels are driven by three-phase induction motors. In the diagram, a synchronous generator 2 is mechanically connected to an internal combustion engine 1 such as a diesel engine, a gasoline engine, or the like, and an AC output of the synchronous generator 2 is converted into a DC power by a diode rectifier 3 used as a first power converter. An inverted-L type filter having a filter reactor 4 and a filter capacitor 5 is connected to a DC intermediate circuit provided between the DC side of the diode rectifier 3 and each of GTO inverters 8L and 8R, which will be described later, so as to smooth the DC power generated from the diode rectifier 3. There is a case in which the inverted-L type filter is omitted when the generator 2 is caused to have the function of reactor 4, and the inverters 8L and 8R are made to have the function of the capacitor 5.

The DC power smoothed through the inverted-L type filter is applied to the GTO inverters 8L and 8R which have, for example, GTO (gate turn off) thyristors. The inverters 8L and 8R are used as second power converters, so as to convert the smoothed DC power into AC power. Of the GTO inverters 8L and 8R, one inverter 8L feeds the AC power to an induction motor 9L for driving left wheels, while the other inverter 8R feeds the power to an induction motor 9R or driving right wheels.

The inverters 8L and 8R convert the smoothed DC power described above into the AC power having a variable voltage and a variable frequency through PWM operation or the like and feeds the AC power to the induction motors 9L and 9R respectively, so that the rotation speed and torque of the induction motors 9L and 9R, that is, the running speed and traction torque of a vehicle are controlled under the reverse conversion (DC-to-AC conversion) operation by the inverters 8L and 8R.

Further, the inverter 8L and the induction motor 9L for left wheels and the inverter 8R and the induction motor 9R for right wheels can be individually controlled, so that the vehicle can smoothly run on a curved running road, and even if slip is generated between the wheels and the ground, the slip can be immediately eliminated by controlling the torque and rotation speed of the wheels.

Further, in FIG. 4, a serial circuit in which a braking resistor 6 and a switch 7, which is closed in braking, are connected in series is connected between positive and negative poles of the DC intermediate circuit. When the vehicle is to be braked, the induction motors 9L and 9R are operated as the induction generators respectively, so that the AC power generated by the induction generators is converted into DC power through the forward conversion (AC-to-DC conversion) operation and the DC power is fed to the DC intermediate circuit. The DC power is consumed by the braking resistor 6 through the switch 7, so that the speed of the vehicle is suppressed through a kind of dynamic braking.

At that time, the adjustment of the power consumed by the braking resistor 6 is achieved by controlling the inverters 8L and 8R.

In the internal combustion engine driven electric vehicle shown in FIG. 4, the voltages of the induction motors 9L and 9R are controlled through the variable-voltage variable-frequency (VVVF) operation by the PWM running or the like of the inverters 8L and 8R, so that the inverters 8L and 8R generate large loss, and the power conversion efficiency is low. Accordingly, there is a disadvantage that the internal combustion engine 1 which is a driving source consumes a large quantity of fuel, so that fuel cost is high.

Further, because various kinds of instruments are mounted in a limited space in this kind of an internal combustion engine driven electric vehicle, it is required that: the driving system can be reduced in size and weight of instruments; the instruments per se are small in size and light in weight; and the whole of the system is high in performance and in efficiency and is inexpensive in cost. Specifically, because it is necessary that the induction motors 9L and 9R are accommodated in the wheels, it becomes more necessary that those induction motors are reduced in size as well as in weight.

FIG. 5 shows a characteristic of a conventional induction motor. Since the driving source of the motor is an internal combustion engine, it is desired that the motor be driven by a constant output in a vehicle speed not lower than $V_1$. The voltage $E_M$ applied to the induction motor becomes constant in a vehicle speed range not lower than $V_2$ as shown in the drawing. Accordingly, if the vehicle speed becomes higher than $V_2$, the magnetic flux $\phi$ of the induction motor is reduced in inverse proportion to the speed, and stalling torque $T_d$ which is maximum overload torque of the induction motor is reduced in inverse proportion to a square of the speed. The torque generated by the induction motor cannot be made to be higher than this stalling torque.

Further, the size of the iron core of the inductor motor is generally determined depending on the size of the stalling torque generated in a vehicle speed range of from zero to $V_2$ as shown in FIG. 5. In order to make the size of an induction motor small, it will do to make the stalling torque small. In a high vehicle speed range (in the range higher than $V_3$ in the drawing), however, the stalling torque $T_d$ becomes smaller than required torque T so that the output P becomes lower than a constant output P' to make the high-speed performance of the vehicle lower.

Therefore, in order to maintain the constant output P' even in the high speed range it is necessary that the required torque T is made to be as shown by the two dots portion of line T' in the drawing in the vehicle speed range higher than $V_3$. Accordingly, it becomes necessary to use a motor having large stalling torque as shown by $T_{d'}$. In other words, the iron core of the motor to be used becomes large so that the motor becomes large in size as well as weight, resulting in a significant problem as a vehicle driving motor.

Next, braking of the internal combustion engine driven electric vehicle will be described. In this kind of vehicle, the power generated in braking is consumed by the braking resistor 6 connected to the DC intermediate circuit as described above. The power consumption $P_B$ is expressed by $P_B = E_d^2/R$, where $E_d$ represents the voltage of the DC intermediate circuit, and R represents the resistance value of the braking resistor 6.

In the conventional braking system, therefore, in order to make the braking power correspond to the operation of the vehicle, it is necessary to control the voltage $E_d$ because the resistance value R is constant in the above expression.

Accordingly, the characteristic becomes so that the braking power is reduced even if the voltage $E_d$ is constant particularly in the high vehicle speed range (in the high vehicle speed range higher than $V_3$ in FIG. 5) to thereby make it difficult to obtain stable braking, and, sometimes, make it impossible to perform braking. This is a significant problem of braking performance. It has been therefore required to provide a braking method in which stable braking force can be obtained all over the operation range. Further, the braking resistor 6 consumes much power to generate much heat, and it has been therefore required to provide an efficient cooling method.

On the other hand, this kind of vehicle requires various large-capacity power sources, for example, a excitation source for a generator, a gate source for GTO thyristors constituting an inverter, a power source for a control device, etc. though not shown. Being large in capacity, those power sources are difficult to be provided by batteries. It is therefore desirable that the power sources are obtained efficiently and stably from a generator driven by an internal combustion engine.

SUMMARY OF THE INVENTION

The present invention has been made in view of the above circumstances and has as an object to solve the various kinds of problems described above.

It is another object of the present invention to provide a method of controlling an internal combustion engine driven electric vehicle in which it is made possible to improve high speed performance, efficiency, and braking performance, while making it possible to improve the fuel cost and to reduce the instruments in size and in weight as well as in cost, and in which stable auxiliary power sources can be realized by use of a generator.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the method of controlling the running under power or power operation of a vehicle, the first aspect of this invention comprises a method of controlling the power operation of a vehicle having an AC generator driven by an internal combustion engine, a first power convertor for converting the AC generator output to DC voltage, an intermediate DC circuit having an input connected to an output of the first power converter, a second power converter for converting the DC output of the intermediate circuit to an AC voltage, AC induction motors connected to the output of the second power convertor for driving the vehicle wheels, and breaking resistors in the intermediate DC circuit for consuming power during vehicle braking, the method comprising: controlling the AC voltage output of the generator during a first speed range of the vehicle from zero to a predetermined first vehicle speed to maintain a first substantially constant DC voltage in the intermediate circuit, controlling the voltage output of the generator during a second speed range of the vehicle from the first predetermined vehicle speed to a second predetermined vehicle speed higher than said first predetermined vehicle speed to increase the DC voltage in the intermediate circuit in proportion to said vehicle speed, controlling the AC voltage output of the generator during a third speed range of the vehicle from the predetermined second speed to a predetermined third speed higher than the second predetermined speed, maintaining a second substantially constant DC intermediate circuit voltage, varying the frequency of the AC voltage of the output of the second power convertor during the first, second and third speed ranges and the amplitude of the AC voltage of the output of the second power convertor during the first and second speed ranges, and maintaining the AC voltage output at the output of the second power converter substantially constant during the third speed range.

According to the second aspect of the present invention, control is made in the same manner as in the first aspect of the present invention until the vehicle speed reaches the third vehicle speed in the third speed range while control is made so that the voltage of the DC intermediate circuit and the AC output voltage of the second power converter are increased as the vehicle speed becomes high in a speed range where the vehicle speed is not lower than the third vehicle speed in the third speed range.

According to a third aspect of the present invention, in an electric vehicle driven by an internal combustion engine comprising an internal combustion engine, an AC generator connected to the internal combustion engine, a first power converter connected to an output side of the AC generator so as to perform AC-to-DC conversion, a second power converter connected to the DC side of the first power converter through a DC intermediate circuit so as to perform DC-to-AC conversion, an induction motor connected to the AC side of the second power converter so as to drive wheels of the vehicle, and braking resistors connected to the DC intermediate circuit so as to consume braking power in vehicle braking, the method of controlling an internal combustion engine driven electric vehicle has a feature that the braking resistors are divided into two groups, semiconductor switches capable of a chopping operation are connected respectively to the groups of the braking resistors, and the semiconductor switches are operated in braking of the vehicle to thereby make the resistance value of the braking resistors variable.

According to a fourth aspect of the present invention, in an electric vehicle driven by an internal combustion engine having an internal combustion engine, an AC generator connected to the internal combustion engine, a first power converter connected to an output side of the AC generator so as to perform AC-to-DC conversion, a second power converter connected to a DC side of the first power converter through a DC intermediate circuit so as to perform DC-to-AC conversion, an induction motor connected to an AC side of the second power converter so as to drive wheels of the vehicle, and a braking resistor connected to the DC intermediate circuit so as to consume braking power in vehicle braking, the method of controlling an internal combustion engine driven electric vehicle has a feature that an auxiliary winding is provided in the generator so as to obtain an exciting power source for the generator and an auxiliary power source for the vehicle from the auxiliary winding.

BRIEF DESCRIPTION OF THE DRAWINGS

The accompanying drawings, which are incorporated in and constitute a part of this specification illustrate embodiment(s) of the invention and, together with the description, serve to explain the objects, advantages and principles of the invention. In the drawings.

DETAILED DESCRIPTION OF PREFERRED EMBODIMENTS

Figure 1:
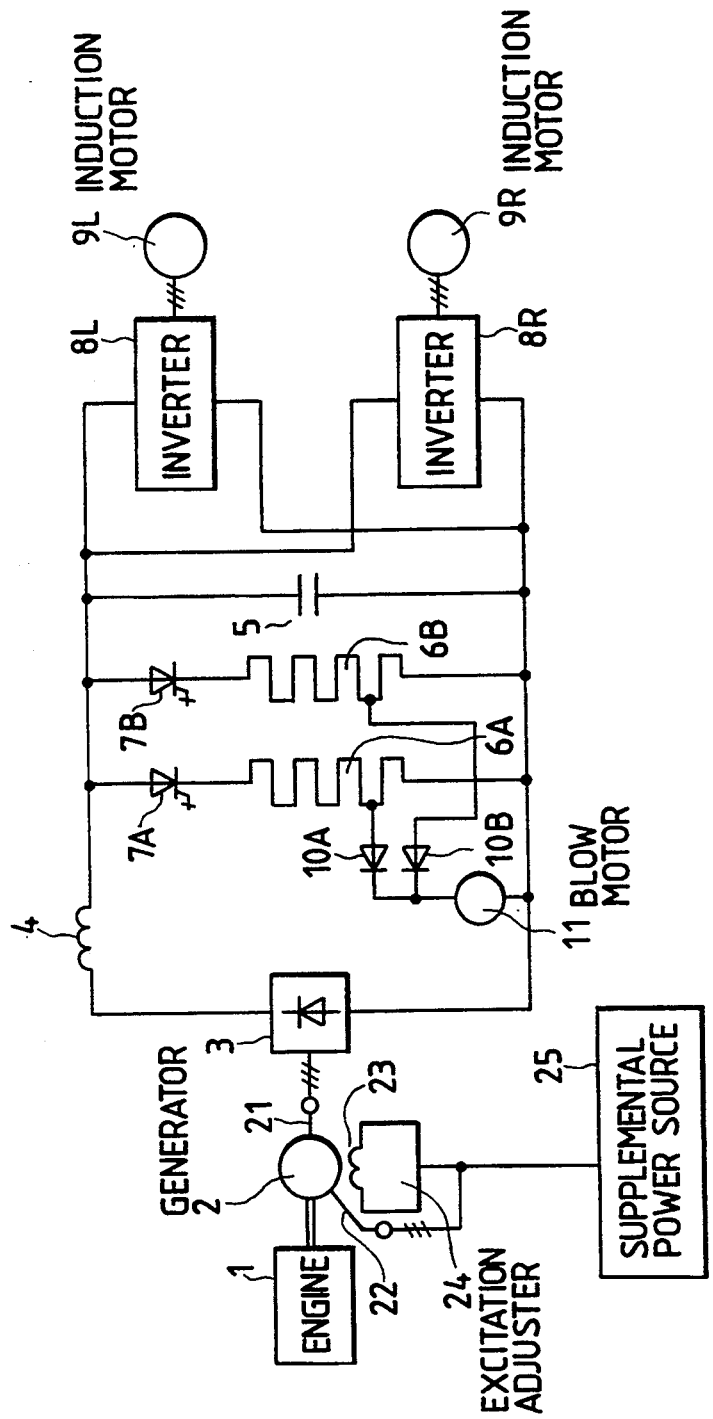
FIG. 1 is a schematic diagram of a main circuit of an electric vehicle to which various embodiments of the present invention are to be applied.

Several embodiments of the present invention will be described in detail.

According to a first aspect of the present invention, in an electric vehicle driven by an internal combustion engine comprising an internal combustion engine, an AC generator connected to the internal combustion engine, a first power converter connected to an output side of the AC generator so as to perform AC-to-DC conversion, a second power converter connected to a DC side of the first power converter through a DC intermediate circuit so as to perform DC-to-AC conversion, an induction motor connected to an AC side of the second power converter so as to drive wheels of the vehicle, and a braking resistor connected to the DC intermediate circuit so as to consume braking power in vehicle braking, the method of controlling the internal combustion engine driven electric vehicle in power operation of the vehicle, comprises the steps of: controlling an output of the AC generator in first, second and third speed ranges of a vehicle speed so that a voltage of the DC intermediate circuit is maintained to a first constant DC voltage in the first speed range of from a zero vehicle speed to a first vehicle speed, the voltage of the DC intermediate circuit is changed in proportion to the vehicle speed in the second speed range of from the first vehicle speed to a second vehicle speed, and the voltage of the DC intermediate circuit is made to be a second constant DC voltage in the third speed range not lower than the second vehicle speed; and controlling the second power converter so that an AC output of the second power converter is made to have a variable voltage and a variable frequency in the first and second speed ranges, while controlling the second power converter so that the AC output of the second power converter is made to have a constant voltage and a variable frequency in the third speed range.

In power operation of the vehicle, the voltage control of the induction motor is carried out through the output voltage control of the AC generator in combination with the voltage control of the second power converter by PWM control or the like, so that the efficiency of the second power converter is improved and the fuel cost of the internal combustion engine is also improved compared with the case where only the PWM control is employed.

According to the second aspect of the present invention, the output voltage of the generator is raised in the high speed range of the vehicle so as to make the voltage of the induction motor high, so that the stalling torque is increased and the vehicle performance is improved in the high speed range.

In this case, it is preferable that the voltage of the DC intermediate circuit and the AC output voltage of the second power converter are increased in proportion to the square root of a ratio of the vehicle speed at that time to the third vehicle speed.

According to the third aspect of the present invention, the resistance value of the braking resistors can be made variable continuously so that it is possible to obtain stable braking performance all over the speed ranges. Further, the braking resistors can be cooled efficiently by using voltage drops generated in the braking resistors.

Preferably, a motor for a cooling blower is connected to the groups of the braking resistors through diodes respectively, and the cooling blower motor and the cooling blower are driven by voltage drops generated in the braking resisters to thereby cool the braking resistors in braking of the vehicle.

According to the fourth aspect of the present invention, the power source for the excitation adjusting device for the AC generator and the power sources for the vehicle auxiliary power source devices can be obtained from the auxiliary winding provided in the AC generator, so that stable power sources of large capacity can be realized without using batteries.

Preferably, here, control is made so that a voltage generated in the auxiliary winding has a predetermined fixed value necessary for vehicle control in braking operation.

Figure 4:
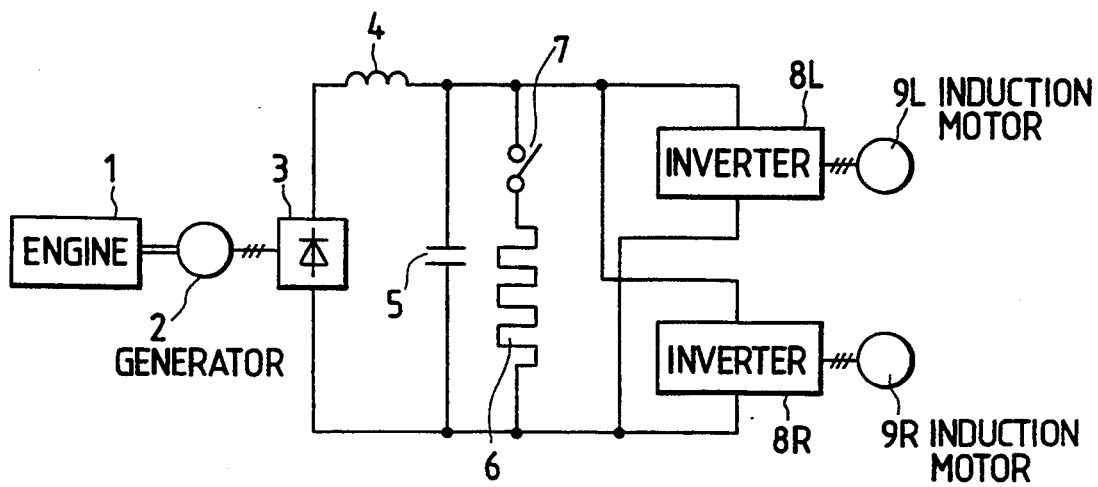
FIG. 4 is a schematic diagram of a main circuit of the electric vehicle which shows a conventional technique.

Referring to the drawings, FIG. 1 is a constituent view of a main circuit of an internal combustion engine driven electric vehicle to which the first, second, third, and fourth embodiments of the present invention are to be applied. The constituent elements which are the same as those in FIG. 4 are correspondingly referenced, and the description thereof will be omitted. Different parts will be mainly described hereunder.

In FIG. 1, two serial circuits in which first and second braking resisters 6A and 6B are connected to semiconductor switches 7A and 7B respectively are connected between positive and negative poles of a DC intermediate circuit respectively. The semiconductor switches 7A and 7B are capable of performing a chopping operation. Potential points where the braking resistors 6A and 6B are connected to the negative pole of the DC intermediate circuit through respective diodes 10A and 10B and commonly through a cooling blower motor 11. The cooling blower motor 11 drives a cooling blower (not shown) to thereby cool the braking resistors 6A and 6B.

On the other hand, in addition to the main winding 21, an auxiliary winding 22 is provided in an AC generator 2. A power source for an excitation adjusting device 24 for controlling the excitation current of an excitation winding 23 of the generator 2 is taken through the auxiliary winding 22. Further, power source for an auxiliary power source device 25 for a vehicle is also taken through the auxiliary winding 22.

Figure 2:
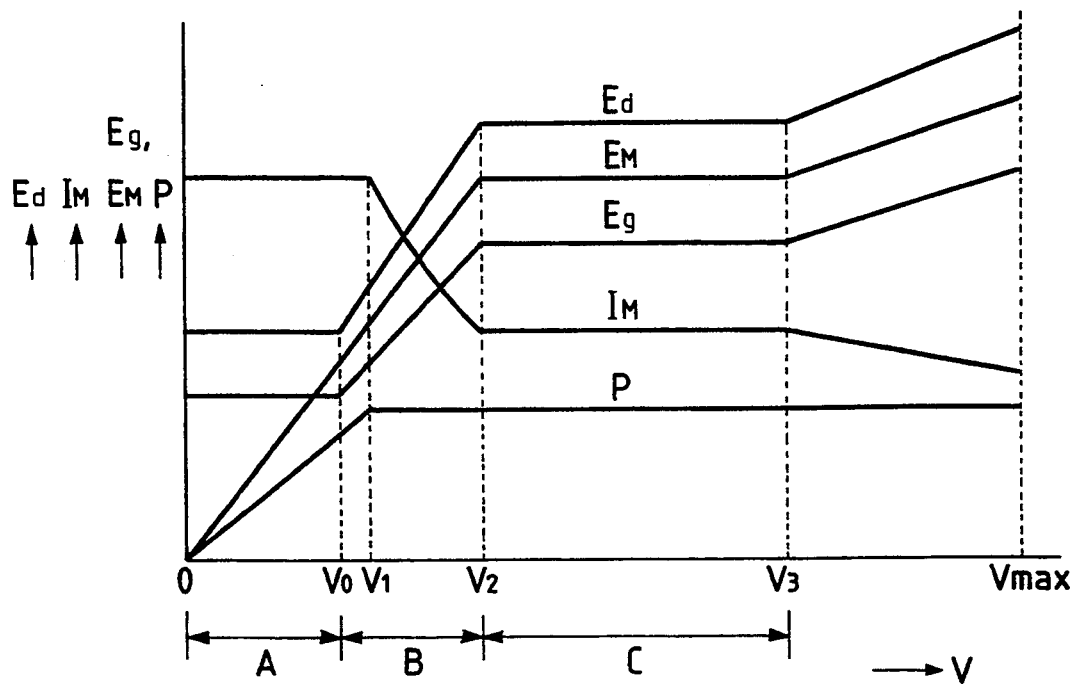
FIG. 2 is a graphical representation of power operation of the embodiment of FIG. 1.

Referring to FIG. 2, the operation of the embodiments in power, operation will be described hereunder.

Figure 5:
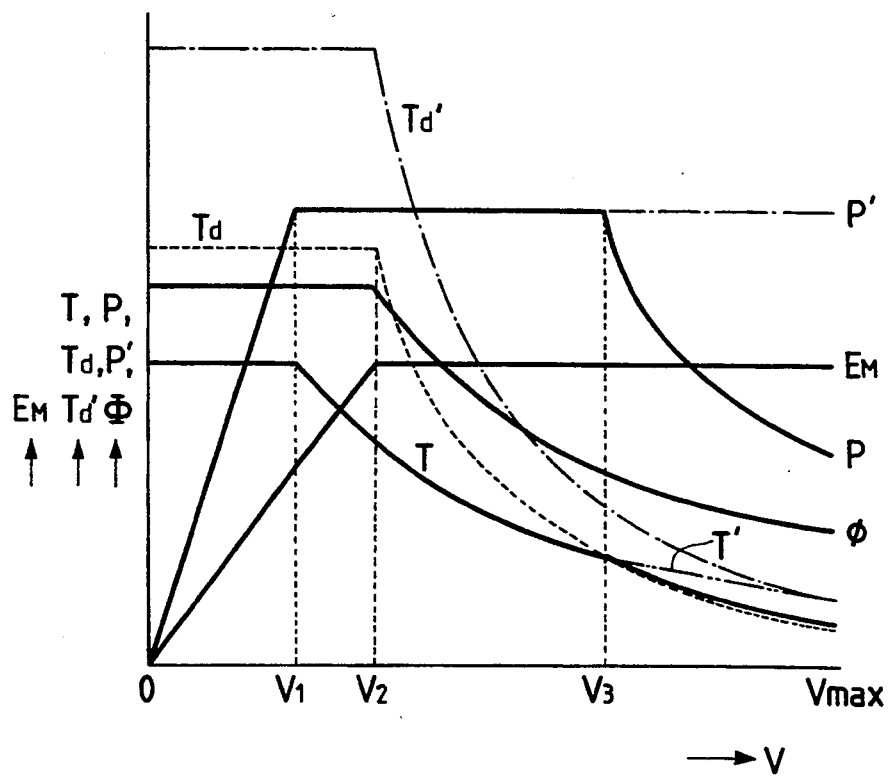
FIG. 5 is a graphical representation of the operation of an induction motor.

In FIG. 2, the meaning of vehicle speeds $V_1$ and $V_2$ is the same as that in FIG. 5. In FIG. 2, in a first speed range A from a vehicle speed zero to a first vehicle speed $V_0$, a generator voltage $E_g$ is kept constant. The value of this voltage is selected to be a value with which the voltages necessary for the vehicle auxiliary power-source device 25 and the excitation adjusting device 24 can be assured. At that time, it is a matter of course that a voltage $E_d$ of the DC intermediate circuit in FIG. 1 is constant.

Further, in the first speed range A, a motor voltage $E_M$ is made variable, so that the inverters 8L and 8R are made to perform VVVF operation through PWM control or the like.

In a second speed range B from the first vehicle speed $V_0$ to a second vehicle speed $V_2$, the generator voltage $E_g$ is increased in proportion to the vehicle speed. Accordingly, the voltage $E_d$ of the DC intermediate circuit is also increased in proportion to the vehicle speed.

Although it is necessary that the motor voltage $E_M$ is also increased in proportion to the vehicle speed, the inverters 8L and 8R are not necessary to perform voltage control through PWM control or the like because the voltage $E_d$ of the DC intermediate circuit is increased in proportion to the vehicle speed, and therefore the inverters 8R and 8L perform only frequency control. The vehicle speed $V_2$ is the speed at which the generator voltage $E_g$ becomes maximum in the speed range B.

In the third speed range C, from the second vehicle speed $V_2$ to a third vehicle speed $V_3$, as shown in the drawing, the $E_g$, $E_d$, and $E_M$ are controlled to be constant. In a high speed range from the third vehicle speed $V_3$ to a maximum value $V_{max}$, the generator voltage $E_g$ is increased corresponding to the vehicle speed so that the motor output P becomes constant. The method of making the voltage high at that time is subject to expression (1), $$E_g \propto \sqrt{(V/V_3)}.$$

In expression (1), V represents the vehicle speed at that time.

Figure 3:
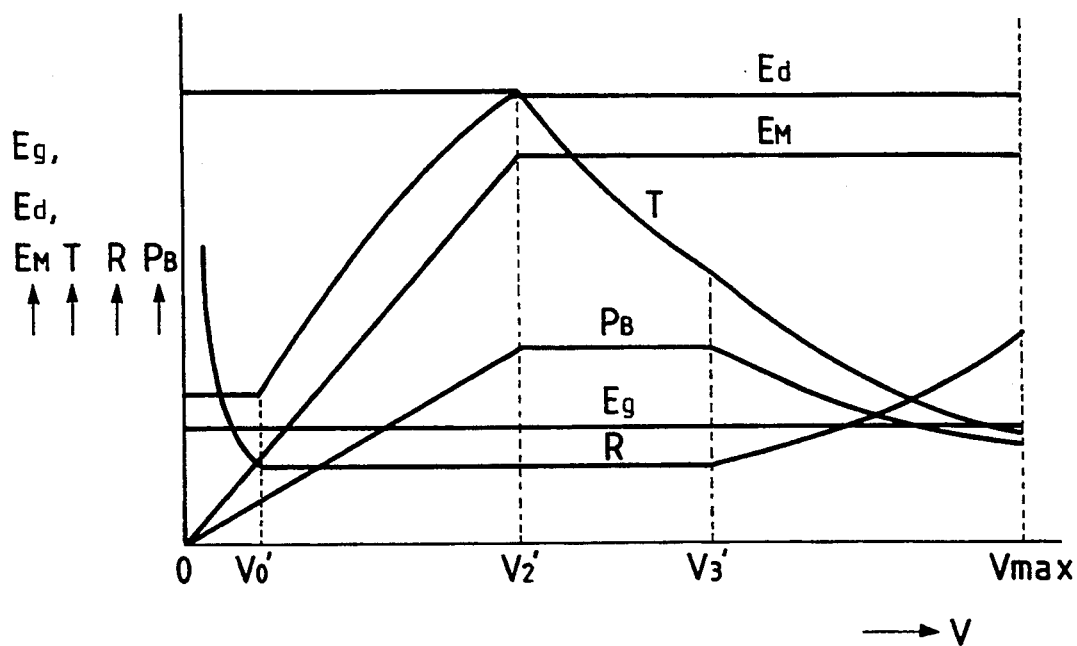
FIG. 3, is a graphical representation of braking operation of the embodiment of FIG. 1.

Referring to FIG. 3, the operation of the present invention in braking operation will be described hereunder.

In FIG. 3, T and $P_B$ designate motor torque, and an output of an induction motor operating as an induction generator, that is, braking power shown in maximum braking. Further, R designates a resistance value of the braking resistors.

The motor torque T is made constant in a speed range from the vehicle speed of zero to a vehicle speed $V_2'$. The braking power $P_B$ is made constant in a speed range from $V_2'$ to $V_3'$. There is a low output characteristic in which the braking power $P_B$ is gradually decreased in a high speed range from the vehicle speed $V_3'$ to the maximum value $V_{max}$. This is because larger torque is generally required in braking than in power operation as described above with respect to the related art.

The generator voltage $E_g$ is kept to a minimum in which the auxiliary power source, etc. can be ensured.

Further, in a speed range higher than the vehicle speed $V_2'$, the voltage $E_d$ of the DC intermediate circuit is made constant, while in a speed range lower than the vehicle speed $V_2'$, the voltage $E_d$ of the DC intermediate circuit is made variable so as to make the braking power $P_B$ be a required value.

In a high speed range not lower than the vehicle speed $V_3'$, the resistance value R of the braking resistors is gradually increased as shown in the drawing because the braking power $P_B$ decreases. The resistance-value varying means can be realized in a manner so that one or both of the semiconductor switches 7A and 7B connected to the braking resistors 6A and 6B in series respectively in FIG. 1 are made to be on or off, or are made to perform a chopping operation.

Further, in a low speed range not higher than the vehicle speed $V_0'$, the voltage $E_d$ of the DC intermediate circuit is kept to a constant value because the voltage $E_d$ cannot be reduced to a value lower than the rectified voltage of the generator voltage $E_g$. Accordingly, the resistance value R is also made high by the chopping operation as shown in the drawing. In a speed range from the vehicle speed $V_0'$ to the vehicle speed $V_3'$ in FIG. 3, the semiconductor switches 7A and 7B are never made to perform the chopping operation but they are merely turned on because the resistance value R is constant in this speed range.

The operation described above is in the case where the braking force is maximum as described above. In the case where the braking force is smaller than the maximum value, the resistance value R of the braking resistors is made larger by the chopping operation. Thus, in braking operation, it is necessary that the resistance value R is made variable in correspondence to the braking force. Accordingly, in this embodiment, the braking resistors are divided into two groups, and the semiconductor switches 7A and 7B capable of performing chopping operation are connected to the resistors 6A and 6B in series respectively, so that the resistance value R is made variable by the on-off or chopping operation of the switches 7A and 7B.

In the braking operation, however, a voltage is applied or no voltage is applied to the braking resistors 6A and 6B in accordance with the degree of the braking force.

The cooling operation for the braking resistors 6A and 6B in the case where such braking operation is performed will be described hereunder. That is, in this embodiment, a single cooling blower motor 11 is connected to the desired potential points of the braking resistors 6A and 6B through the diodes 10A and 10B, so that when a voltage is applied to one of the resistors 6A and 6B, the voltage is applied to the motor 11, so that both of the resistors 6A and 6B can be blown and cooled by the cooling blower.

Next, the auxiliary power source in this embodiment will be described. As described above, the auxiliary winding 22 is provided in the generator 2, so that the power sources for the excitation adjusting device 24 and the auxiliary power-source device 25 can be obtained from the auxiliary winding 22. Here, the auxiliary power-source device 25 is also used as a control power source or the like for the inverters 8L and 8R.

In this embodiment, although the voltage of the auxiliary winding 22 also fluctuates correspondingly to the generator voltage $E_g$ shown in FIGS. 2 and 3, the generator voltage $E_g$ and further, the voltage of the auxiliary winding 22 can be controlled by the excitation adjusting device 24 so as to have stable values respectively. Accordingly, the power source having stable and relatively large capacity can be realized without using batteries.

As described above, according to the first aspect of the present invention, in power operation of the vehicle, the voltage control of the induction motor is carried out through the output voltage control of the AC generator in combination with the voltage control by PWM control or the like of the second power converter constituted by an inverter or the like, and more specifically, the second power converter is subjected to one pulse operation in the second speed range corresponding to an intermediate speed range, and the output voltage of the second power converter, that is, the voltage of the induction motor, is made variable by the control on the output voltage of the generator. Accordingly, it is possible to reduce the loss generated in the second power converter and to improve the efficiency of the second power converter compared with the case where only the PWM control is employed, and therefore it is possible to reduce the fuel cost of the internal combustion engine.

According to the second aspect of the present invention, the output voltage of the generator is raised in the high speed range higher than the third vehicle speed so as to make the voltage of the induction motor high and increase the torque generation so that the vehicle performance is improved in the high speed range. Accordingly, in the case of the same vehicle performance, the induction motor can be reduced in size and in weight. In this kind of vehicle in which a motor is accommodated in a wheel, the effect of reduction in size as well as weight of the vehicle is extremely significant.

According to the third aspect of the present invention, the resistance value of the braking resistors divided into two groups can be made variable continuously in accordance with the vehicle speed so that it is possible to obtain stable braking performance all over the speed ranges. Further, the braking resistors can be cooled efficiently by using voltage drops generated in the braking resistors.

According to the fourth aspect of the present invention, the power source for the excitation adjusting device for the AC generator and the power sources for the vehicle auxiliary power source devices can be obtained from the auxiliary winding provided in the AC generator, so that stable power sources of large capacity can be realized without using batteries.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

We claim:

1. A method of controlling the power operation of a vehicle having an AC generator driven by an internal combustion engine, a first power convertor for converting the AC generator output to DC voltage, an intermediate DC circuit having an input connected to output of the first power converter, a second power converter for converting the DC output of the intermediate circuit to an AC voltage, AC induction motors connected to the output of the second power convertor for driving the vehicle wheels, and breaking resistors in the intermediate DC circuit for consuming power during vehicle braking said method including the steps of:

controlling the AC voltage output of the generator during a first speed range of the vehicle from zero to a predetermined first vehicle speed to maintain a first substantially constant DC voltage in the intermediate circuit;

controlling the voltage output of the generator during a second speed range of the vehicle from the first predetermined vehicle speed to a second predetermined vehicle speed higher than said first predetermined vehicle speed to increase the DC voltage in the intermediate circuit in proportion to said vehicle speed;

controlling the AC voltage output of the generator during a third speed range of the vehicle from the predetermined second speed to a predetermined third speed higher than the second predetermined speed, maintaining a second substantially constant DC intermediate circuit voltage;

varying the frequency of the AC voltage output of the second power convertor during the first, second and third speed ranges and the amplitude of the AC voltage output of the second power convertor during the first and second speed ranges; and maintaining the AC voltage output of the second power converter substantially constant during the third speed range.

2. The method of claim 1 further including the step of:

increasing the DC voltage of the intermediate circuit and the AC output voltage of the second power converter during a high speed range of the vehicle greater than the predetermined third vehicle speed.

3. The method of claim 2 wherein, the DC voltage of the intermediate circuit and the AC output of the second power convertor are increased in proportion to the square root of a ratio of the actual vehicle speed and the predetermined third vehicle speed.

* * * * *